No. 768,893. PATENTED AUG. 30, 1904.
A. BROOMFIELD.
PLANTER ATTACHMENT FOR PLOWS.
APPLICATION FILED DEC. 5, 1903.
NO MODEL. 2 SHEETS—SHEET 1.

WITNESSES:
C. H. Walker.
Geo. E. Tew.

INVENTOR
Austin Broomfield
BY
Milo B. Stevens & Co.
Attorneys

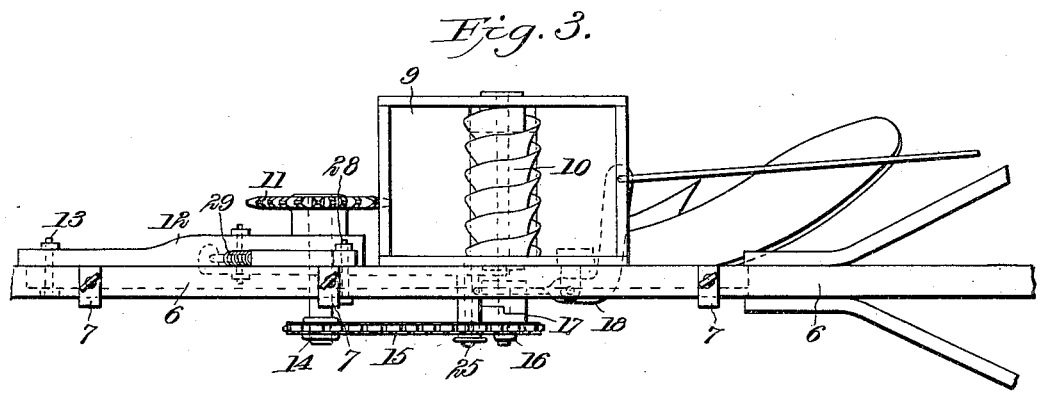

No. 768,893. Patented August 30, 1904.

UNITED STATES PATENT OFFICE.

AUSTIN BROOMFIELD, OF CRAIG, MISSISSIPPI.

PLANTER ATTACHMENT FOR PLOWS.

SPECIFICATION forming part of Letters Patent No. 768,893, dated August 30, 1904.

Application filed December 5, 1903. Serial No. 183,891. (No model.)

*To all whom it may concern:*

Be it known that I, AUSTIN BROOMFIELD, a citizen of the United States, residing at Craig, in the county of Yazoo and State of Mississippi, have invented new and useful Improvements in Planter Attachments for Plows, of which the following is a specification.

This invention relates particularly to a planter attachment for plows, and it is especially useful for replanting seed, such as cotton and corn, at the time of the first cultivation in case of a small or incomplete stand from the first planting.

The object of the invention is to produce an improved device of that kind characterized particularly by an invariable feed irrespective of the surface of the ground upon which the wheel travels which operates the feed mechanism. An idle pulley is so carried that as the plow-beam rises and lowers it bears against the chain and produces the proper tension thereof to prevent the same from running loose. The seeder mechanism is actuated by a land-wheel which runs just ahead of the plow, and the chain referred to is part of the device which transmits the motion from the land-wheel to the feed-shaft of the seeder.

Figure 1:
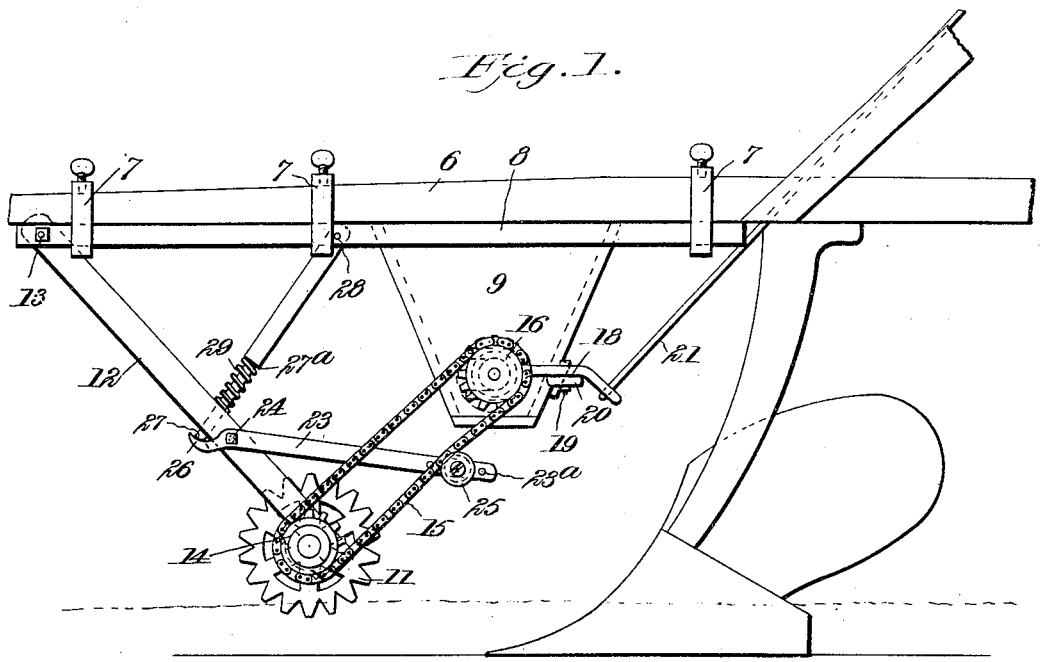
Figure 2:
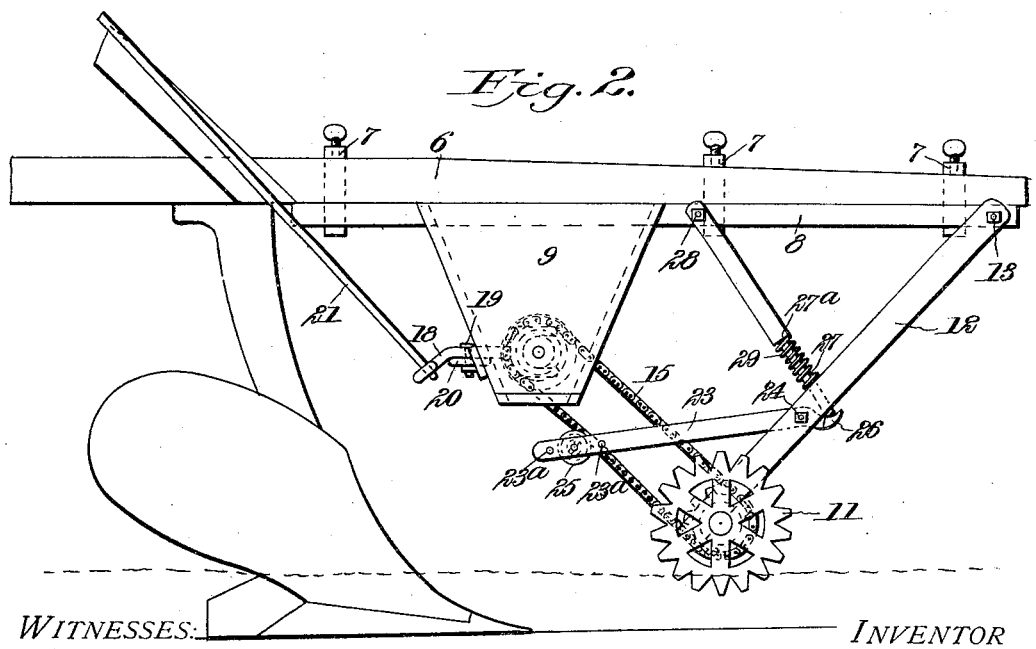

In the accompanying drawings, Figure 1 is a side elevation of the apparatus applied to a plow. Fig. 2 is an elevation of the opposite side. Fig. 3 is a top view, and Fig. 4 is a front view, of the planter detached from the plow.

Referring specifically to the drawings, the beam of the plow is shown at 6, and to this is fastened by clamps 7 the bar 8, to which the seeder box or hopper 9 is secured. This box contains in the lower end thereof a rotary feeding device of any approved construction, such as an auger-screw 10. The particular kind of feeding device is immaterial, and this invention is not limited to any particular kind, although the embodiment herein shown and described has an auger-screw, as indicated, which when rotated feeds through a hole in the bottom of the box, so that the seed drop on the ground before the breast of the plow. To operate the feed-screw of the planter, a land-wheel 11 is used, carried in bearings at the lower end of an arm 12, which is pivoted at its upper end at 13 to the bar 8 and projects thence at a rearward and downward inclination. The pivotal attachment to the bar 8 allows the land-wheel to rise and fall with the surface of the ground or the variation of the depth of the cut of the plow. The shaft of the land-wheel carries a sprocket-wheel 14, which is connected by a chain 15 to a sprocket-wheel 16, loose on the outer projecting portion of the shaft of the feed-screw 10.

At 17 a clutch is indicated, slidable on the shaft of the feed-screw to couple said shaft with the sprocket-wheel 16, and this clutch is operated by a forked lever 18, which is pivoted at 19 to a bracket 20, projecting from the feed-box. The lever is operated by a rod 21, connected to a handpiece (not shown) at the handle of the plow, so that the planting mechanism may be thrown in or out of gear, as desired, the intent being when replanting to throw it in gear at the skips and throw it out where the stand is good.

It is obvious that ordinarily as the land-wheel travels over the ground its distance from the feed-box is being continually varied. Therefore means are provided to take up any slack in the chain caused by said variation. These means consist of a lever 23, which is pivoted at 24 to the bar 12 and carries on one arm an idler 25 in contact with the chain. The spindle or shaft of the idler is adjustable in a series of holes 23ª in the lever. The other arm of the lever is offset laterally under the bar 12 and has there a cup or seat 26 to receive the point or lower end of a thrust-rod 27, the upper end of which is pivoted at 28 to the bar 8. The lower end of this rod is reduced and works through a hole in the bar 12, and normally the bar 12 is pressed down as far as it will go by a spring 29, which is coiled around the rod in compression between the bar 12 and a shoulder 27ª on the rod.

As the land-wheel raises and lowers the rod 27 works through the hole in the bar 12 and in the seat or cup in the end of the lever 23, so that when the land-wheel lifts the bar pushes down that end of the lever and lifts the idler on the other end, which by contact with the chain takes up the slack therein accordingly. This holds the chain on both of its sprocket-wheels and prevents the same from running off. The construction acts to automatically tighten the chain according to all variations of the surface.

What I claim as new, and desire to secure by Letters Patent, is—

1. The combination with the beam, of the seed-planter box and land-wheel carried thereby and variable in distance from each other, a belt connection between the wheel and the feed devices of the box, and means to keep the belt in proper tension during such variations.

2. The combination with the beam and the seedbox fixed thereto and having feeding devices, of the land-wheel carried by the beam and having vertical movement according to the land, a belt connection between the wheel and the feeding devices, an idler bearing against the belt, and means to vary the position of the idler according to the vertical movement of the wheel.

3. The combination with the beam, and the seedbox fixed thereto having a rotary feed device, of a land-wheel, a vertically-swinging bar connecting the beam and wheel, a driving-belt between the wheel and the feed device, a lever pivoted on the bar and having an idler bearing against the belt, and a thrust-rod connecting the beam and the lever.

In testimony whereof I have signed my name to this specification in the presence of two subscribing witnesses.

AUSTIN BROOMFIELD.

Witnesses:
  E. DENNING,
  J. D. RUSSELL.